(No Model.)

A. D. GOODELL.
DRILL CHUCK.

No. 566,905. Patented Sept. 1, 1896.

Witnesses.
Charles S. Bacon
Simeon E. King

Inventor.
Albert D. Goodell
By Chas. H. Burleigh
Attorney

UNITED STATES PATENT OFFICE.

ALBERT D. GOODELL, OF SHELBURNE FALLS, MASSACHUSETTS.

DRILL-CHUCK.

SPECIFICATION forming part of Letters Patent No. 566,905, dated September 1, 1896.

Application filed May 27, 1896. Serial No. 593,201. (No model.)

*To all whom it may concern:*

Be it known that I, ALBERT D. GOODELL, a citizen of the United States, residing at Shelburne Falls, in the county of Franklin and State of Massachusetts, have invented a new and useful Improvement in Drill-Chucks, of which the following, together with the accompanying drawings, is a specification sufficiently full, clear, and exact to enable persons skilled in the art to which this invention appertains to make and use the same.

My present invention relates to certain improvements in the construction of internal parts of the chuck and the way and manner in which the jaw-supporting seat is combined with the jaws and body part, the object being to render the chuck more efficient and convenient for operation and to afford a chuck that will give a firm grip of the jaws upon the drill without requiring the execution of extraordinary force for working the sleeve when closing and opening the chuck.

My invention consists in the peculiar construction and arrangement of parts as illustrated and hereinafter explained, the particular subject-matter claimed being definitely specified in the summary.

Figure 1:
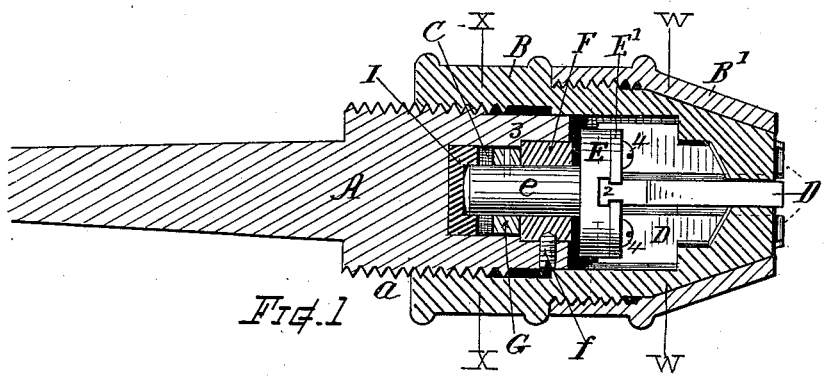
Figures 2, 3, 4:
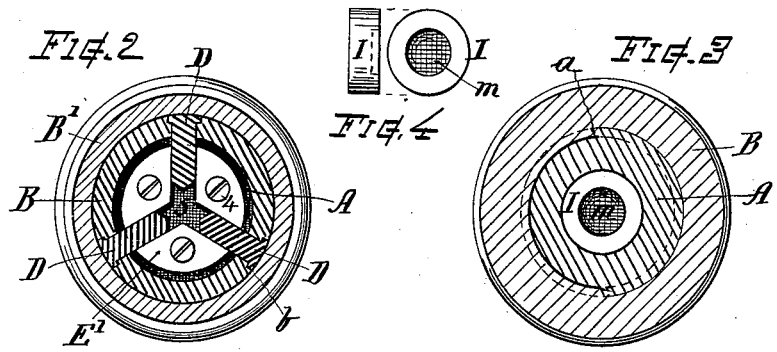
Figures 5, 6, 7:
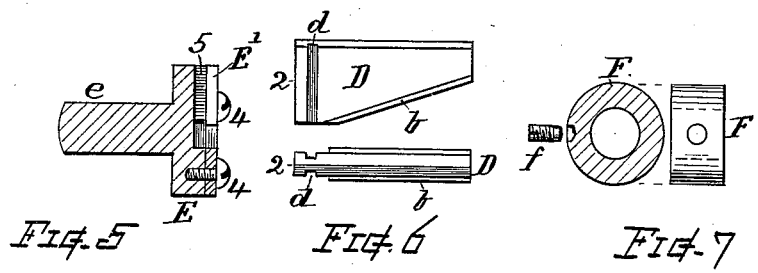

In the drawings, Figure 1 is a longitudinal sectional view of a drill-chuck embodying my invention. Fig. 2 is a transverse section at line W W. Fig. 3 is a transverse section at line X X. Fig. 4 shows a side and face view of the center step. Fig. 5 is a longitudinal section of the axled jaw-seat. Fig. 6 shows a side and face view of the jaw, and Fig. 7 shows a section and side view of the ring-bearing for supporting the jaw-seat axle.

Referring to parts, A denotes the body or part that fits the spindle of the lathe or drilling-machine. Said body part is externally screw-threaded at $a$ and has mounted thereon the operating-sleeve B, which is internally threaded to match the threads $a$, slotted at its fore end and fitted with inclined guideways for the jaw, and generally arranged for operation in well-known manner.

D indicates the jaws, formed with the usual inclined surfaces and lips $b$ for guidance within the sleeve B beneath its tapered cap B' in well-known manner. Near their rear ends the jaws are fitted with side grooves $d$, perpendicular to the central axis, forming thereon T-shaped seating ends 2, as shown.

In accordance with my invention the fore end of the body A is provided with an internal chamber or cylindrical cavity C, that extends inward from the end thereof and is formed axially coincident with the body-axis and concentric with the several circular parts of the chuck.

E indicates the rotatable seat for supporting the jaws D against endwise-thrust pressures. Said seat is provided with a journal, spindle, or axle $e$, that projects from its rear side and extends into the chamber C. A hardened-steel ring or bearing F is provided for supporting the axle $e$ at the mouth of the chamber C, and a step-disk I, of hardened steel or suitable material, is fitted in the inner end of the chamber and against which the end of said seat-axle runs, the end of the seat-axle being preferably rounded or slightly pointed to afford small bearing-surface. The face of the step I is best made with a slight cavity $m$ for receiving the end of the axle $e$ in the manner shown. The bearing-ring F fits the opening of the chamber and rests against a shoulder 3 at its inner angle. It is secured in place by a fastener or screw $f$, as indicated. A collar G is secured to the spindle $e$ by a pin or other fastening, which collar retains the axle and jaw-seat E securely in connection with the bearing F and body A, while permitting free rotation of the seat with the jaws and sleeve and independent of the body part.

The face of the seat E is formed with radial grooves 5 for receiving the ends 2 of the jaws D, and suitable plates E' are secured to said face by screws 4, the edges of which plates engage with the grooves $d$ in the sides of the jaws, thereby retaining the jaws in connection with the seat while permitting and guiding their radial movement for opening and closing to release or grip the drill-shank.

The operating-sleeve B and its cap B' embrace the jaws D in well-known manner. When the sleeve is rotated upon the thread $a$, it has endwise action relatively to the body, and the jaws are opened or closed according to the direction of rotation by the action of the inclined surfaces at the outer edges of the jaws, said jaws being controlled endwise by the seat in connection with the body part.

By constructing and combining the parts in the manner shown and described a very efficient and durable mechanism is produced. The parts are simple and practical for manufacture and are not liable to breakage or derangement by severe usage. The seat, axle, and bearing-step afford a substantial but easily-turning support for the jaws which are connected therewith in a manner to avoid cramping strains or weakness of attachment, and the chuck can be operated with ease while it will grip the drill with all the force necessary for holding it firm under all conditions of work.

It will be understood that I do not broadly claim a drill-chuck having a rotatable jaw-seat irrespective of its construction, as my invention relates to the improved construction of mechanism.

I claim as my invention herein, to be secured by Letters Patent—

1. In a drill-chuck, the combination as hereinbefore described, with the body part having the central cylindrical cavity or chamber in its fore end, and the radially-grooved jaw-seat having the rearwardly-projecting axle thereon, of the hardened bearing-ring internally forming a bearing about said axle and externally fitting within the mouth of said chamber, and removably secured therein by suitable fastening means, the hardened step-disk fitting the inner end of said chamber and having its front face adapted for receiving and supporting the end of said seat-axle, as shown, and the retaining-collar secured upon said axle adjacent to the inner end of said bearing-ring and rotatable within the chamber, all substantially as set forth.

2. In a drill-chuck, the jaw-seat having the rearwardly-extended axle rotatably supported in connection with the chambered fore end of the body part, and provided with a radially-grooved face with overlying plates attached to said face; in combination with the jaws having side grooves $d$ therein, the rear ends of said jaws arranged for radial movement within said radial grooved seat and confined and guided by the edges of said plates which engage with the side grooves of the jaws; and means substantially as described for operating said jaws.

3. The within-described drill-chuck, comprising, in combination with the externally-threaded body, the operating-sleeve mounted on said body and having inclined guideways, the jaws supported therein and the conical cap over the jaws; of the freely-rotatable jaw-seat having means for connection with said jaws, and provided with the rearwardly-extended axle, the axle-bearing supported in the chambered fore end of the body, the fastening-screw therefor, the hardened step fitting within the chamber and sustaining the end of said jaw-seat axle, and a retaining-collar fixed on said axle in rear of said bearing, all substantially as and for the purposes set forth.

Witness my hand this 23d day of May, 1896.

ALBERT D. GOODELL.

Witnesses:
MERTON Z. WOODWARD,
CLIFTON L. McKNIGHT.